United States Patent
Kim

(10) Patent No.: US 10,511,985 B2
(45) Date of Patent: Dec. 17, 2019

(54) METHOD AND DEVICE FOR TERMINAL PERFORMING WLAN MEASUREMENT

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/749,661

(22) PCT Filed: Aug. 1, 2016

(86) PCT No.: PCT/KR2016/008453
§ 371 (c)(1),
(2) Date: Feb. 1, 2018

(87) PCT Pub. No.: WO2017/026720
PCT Pub. Date: Feb. 16, 2017

(65) Prior Publication Data
US 2018/0227784 A1    Aug. 9, 2018

Related U.S. Application Data

(60) Provisional application No. 62/204,425, filed on Aug. 12, 2015.

(51) Int. Cl.
*H04W 24/10* (2009.01)
*H04W 24/08* (2009.01)
(Continued)

(52) U.S. Cl.
CPC ........... *H04W 24/10* (2013.01); *H04W 24/08* (2013.01); *H04W 36/14* (2013.01); *H04W 84/12* (2013.01)

(58) Field of Classification Search
None
See application file for complete search history.

(56) References Cited

U.S. PATENT DOCUMENTS 10,271,268 B2 * 4/2019 Fan .................. H04W 48/14
370/328
2008/0227465 A1 * 9/2008 Wachter ............... H04W 4/029
455/456.1
(Continued)

FOREIGN PATENT DOCUMENTS

EP          2757829 A1    7/2014
WO          2012060615    5/2012
(Continued)

OTHER PUBLICATIONS

Ericsson, "WLAN Measurement Reporting," R2-152475, 3GPP TSG-RAN WG2 #90, Fukuoka, Japan, May 15, 2015, see sections 2.2-2.2.2.
(Continued)

*Primary Examiner* — Anh Vu H Ly
(74) *Attorney, Agent, or Firm* — Dentons US LLP

(57) ABSTRACT

Provided are a method for a terminal performing wireless local area network (WLAN) measurement in a wireless communication system, and a device supporting same. A terminal receives a WLAN measurement configuration comprising an indicator and a subject to be measured, and on the basis of the indicator, determines a subject for performing a WLAN measurement on, and performs a WLAN measurement on the determined subject for performing a WLAN measurement on, wherein the indicator may indicate whether a measurement of a WLAN AP detected by the terminal is allowed.

9 Claims, 12 Drawing Sheets

(51) Int. Cl.
*H04W 84/12* (2009.01)
*H04W 36/14* (2009.01)

(56) References Cited

U.S. PATENT DOCUMENTS

| | | | |
|---|---|---|---|
| 2009/0143076 A1* | 6/2009 | Wachter | G01S 5/0236 455/456.1 |
| 2013/0088983 A1* | 4/2013 | Pragada | H04W 16/14 370/252 |
| 2014/0024357 A1* | 1/2014 | Koskinen | H04W 36/0088 455/418 |
| 2014/0045494 A1* | 2/2014 | Pekonen | H04W 36/0005 455/434 |
| 2014/0056243 A1* | 2/2014 | Pelletier | H04W 74/04 370/329 |
| 2014/0079022 A1* | 3/2014 | Wang | H04W 36/22 370/331 |
| 2015/0131460 A1* | 5/2015 | Sridhara | H04W 48/20 370/252 |
| 2015/0319661 A1 | 11/2015 | Jung et al. | |
| 2015/0358884 A1* | 12/2015 | Nagasaka | H04W 48/18 370/230 |
| 2016/0165494 A1* | 6/2016 | Warburton | H04L 67/1072 370/329 |
| 2016/0234644 A1* | 8/2016 | Belghoul | G01C 5/06 370/328 |
| 2016/0242058 A1* | 8/2016 | Kazmi | H04L 5/001 370/328 |
| 2016/0323903 A1* | 11/2016 | Fujishiro | H04W 48/16 370/328 |
| 2016/0360462 A1* | 12/2016 | Chockalingam | H04W 36/30 370/328 |
| 2017/0026929 A1* | 1/2017 | Grischy | H04W 24/04 370/328 |
| 2017/0070923 A1* | 3/2017 | Li | H04W 36/0066 370/328 |
| 2018/0054822 A1* | 2/2018 | Kim | H04L 5/00 370/328 |
| 2018/0220303 A1* | 8/2018 | Futaki | H04W 48/18 370/328 |
| 2018/0220319 A1* | 8/2018 | Kim | H04W 24/10 370/328 |
| 2018/0227811 A1* | 8/2018 | Nagasaka | H04W 28/08 370/328 |
| 2018/0227812 A1* | 8/2018 | Nagasaka | H04W 24/10 370/328 |

FOREIGN PATENT DOCUMENTS

| | | |
|---|---|---|
| WO | 2012148203 | 11/2012 |
| WO | 2014098505 | 6/2014 |
| WO | 2014098531 A1 | 6/2014 |

OTHER PUBLICATIONS

CATT, "Considerations on WLAN Measurements," R2-152129, 3GPP TSG-RAN WG2 #90, Fukuoka, Japan, May 15, 2015, see sections 2-3.

R2-132020: 3GPP TSG RAN WG2 Meeting #82, 20-14, May 2013, Fukuoka, Japan, Limitations on WLAN measurements for WLAN/3GPP Radio Interworking, Broadcom Corporation, pp. 1-6.

* cited by examiner (a)

(b)

METHOD AND DEVICE FOR TERMINAL PERFORMING WLAN MEASUREMENT

CROSS-REFERENCE TO RELATED APPLICATIONS

This application is the National Stage filing under 35 U.S.C. 371 of International Application No. PCT/KR2016/008453, filed on Aug. 1, 2016, which claims the benefit of U.S. Provisional Application No. 62/204,425 filed on Aug. 12, 2015, the contents of which are all hereby incorporated by reference herein in their entirety.

BACKGROUND OF THE INVENTION

Field of the Invention

The present invention relates to a wireless communication system, and more particularly, to a method for performing, by a user equipment (UE), WLAN measurement in a wireless communication system, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A wireless communication system may support providing services to a user equipment (UE) through a plurality of access networks. A UE may receive services from a 3GPP access network, such as a mobile wireless communication system, and may also receive services from a non-3GPP access network, such as a Worldwide Interoperability for Microwave Access (WiMAX) network or a wireless local area network (WLAN).

A WLAN is a method based on a radio frequency technology, which enables wireless access to the Internet at home, at work, or in a particular service-providing area using mobile devices, such as a personal digital assistant (PDA), a laptop computer, and a portable multimedia player (PMP).

SUMMARY OF THE INVENTION

In WLAN measurement, measurement on detected WLAN APs other than WLAN APs listed by a WLAN measurement configuration and measurement result reporting may be inappropriate. However, a network may need a report on the measurement result of a WLAN AP detected by a UE other than the WLAN APs listed by the measurement configuration in order to achieve a SON. Therefore, the UE may need to report the measurement results of not only the WLAN APs listed by the WLAN measurement configuration but also the WLAN AP detected by the UE.

According to one embodiment, there is provided a method for performing, by a UE, wireless local area network (WLAN) measurement in a wireless communication system. The method may include: receiving a WLAN measurement configuration including an indicator and a measurement object; determining an object of WLAN measurement based on the indicator; and performing WLAN measurement on the determined object of WLAN measurement, wherein the indicator may indicate whether measurement on a WLAN AP detected by the UE is allowed.

When the indicator indicates that measurement on the detected WLAN AP is allowed, the object of WLAN measurement may include a listed WLAN AP and the detected WLAN AP. When the measurement object includes WLAN frequency information, the detected WLAN AP may be a WLAN AP on a WLAN frequency listed in the WLAN frequency information. The listed WLAN AP may include at least one of a WLAN frequency list, a WLAN AP ID list, and a WLAN AP group ID list. The detected WLAN AP may not be included in the listed WLAN AP but may be a WLAN AP detected by the UE.

When the indicator indicates that measurement on the detected WLAN AP is not allowed, the object of WLAN measurement may include a listed WLAN AP.

The method may further include reporting a WLAN measurement result.

The method may further include: determining an object of WLAN measurement reporting based on the indicator; and reporting a WLAN measurement result of the determined object of WLAN measurement reporting, wherein the indicator may indicate whether measurement result reporting on the WLAN AP detected by the UE is allowed.

When the indicator indicates that measurement result reporting on the detected WLAN AP is allowed, the object of WLAN measurement reporting may include a listed WLAN AP and the detected WLAN AP. When the measurement object includes WLAN frequency information, the detected WLAN AP may be a WLAN AP on a WLAN frequency listed in the WLAN frequency information.

When the indicator indicates that measurement result reporting on the detected WLAN AP is not allowed, the object of WLAN measurement reporting may be a listed WLAN AP The WLAN measurement configuration may be received from a serving cell The indicator may be included in the measurement object.

According to another embodiment, there is provided a UE for performing WLAN measurement in a wireless communication system. The UE may include: a memory; a transceiver; and a processor to connect the memory and the transceiver, wherein the processor may be configured to: control the transceiver to receive a WLAN measurement configuration comprising an indicator and a measurement object; determine an object of WLAN measurement based on the indicator; and perform WLAN measurement on the determined object of WLAN measurement, wherein the indicator may indicate whether measurement on a WLAN AP detected by the UE is allowed.

A UE may selectively perform measurement on a WLAN AP detected by the UE or measurement result reporting.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
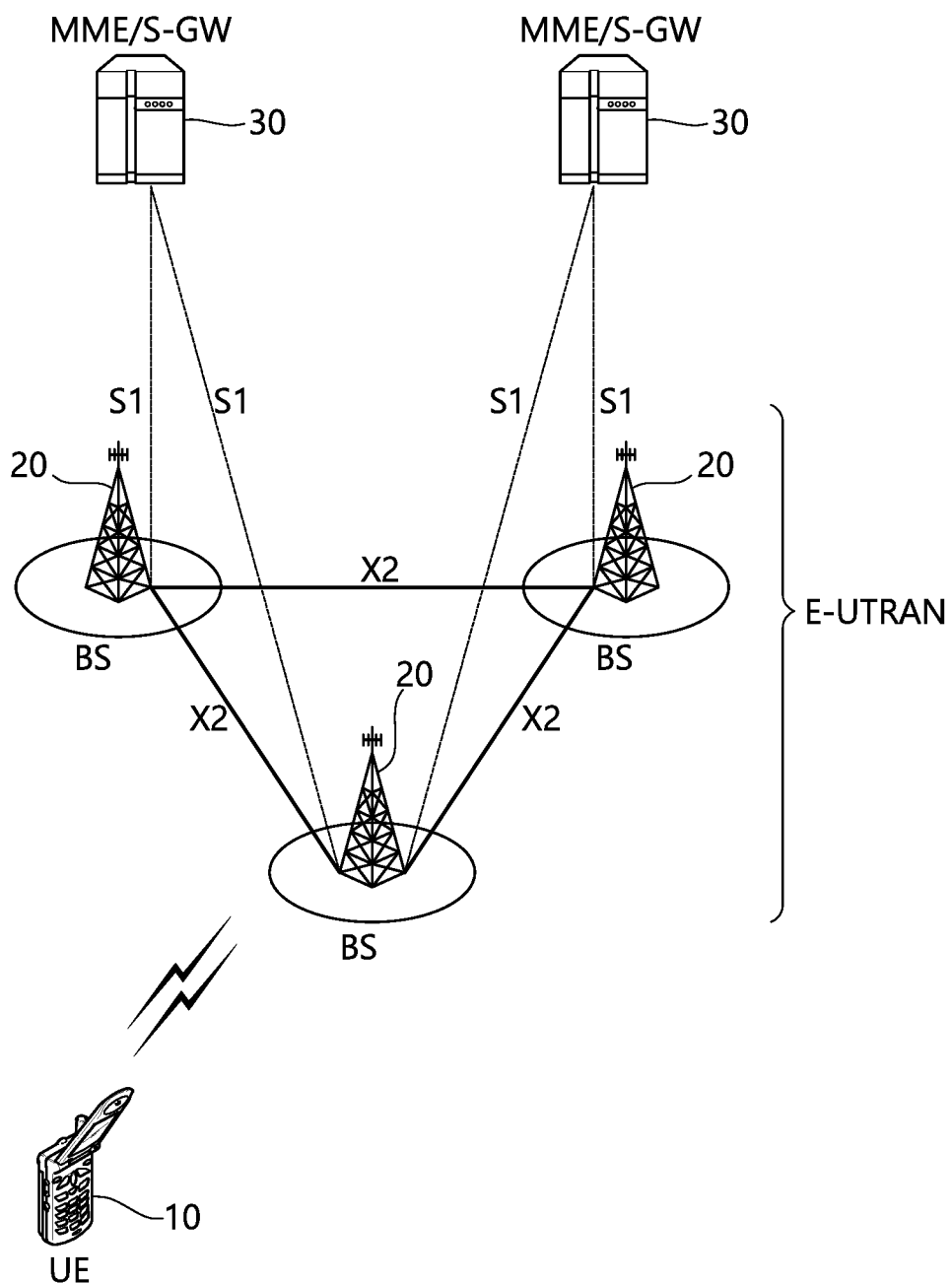
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
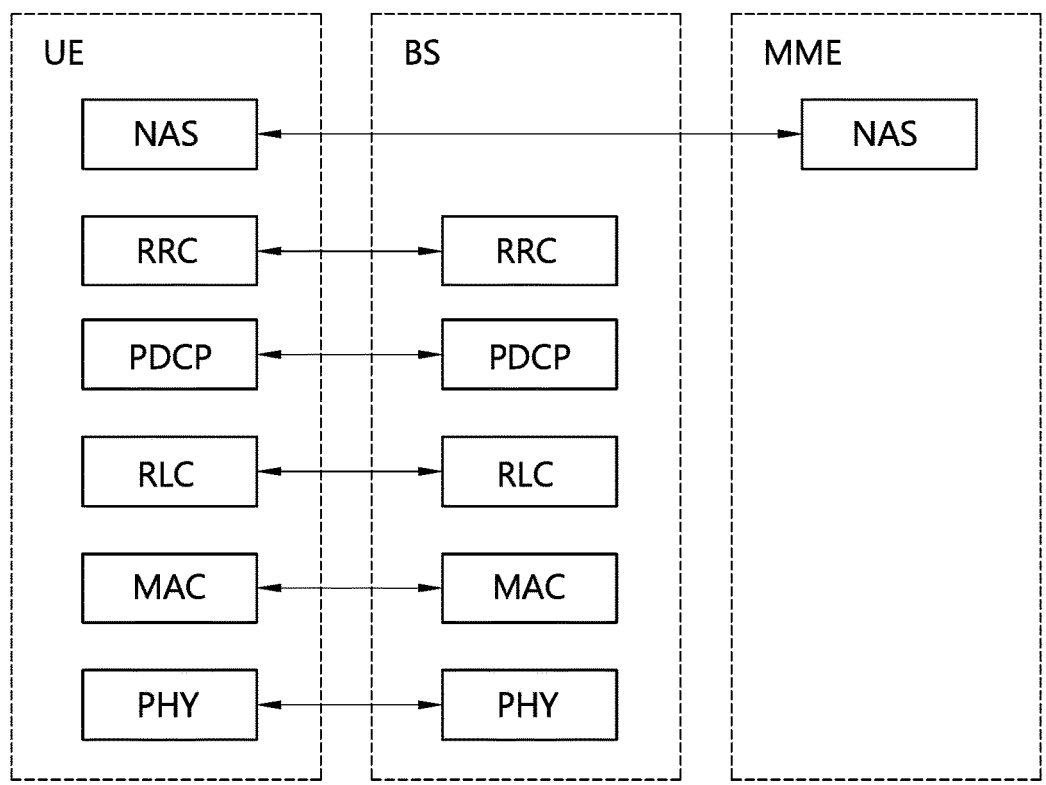
FIG. 2 shows a control plane of a radio interface protocol of an LTE system.
Figure 3:
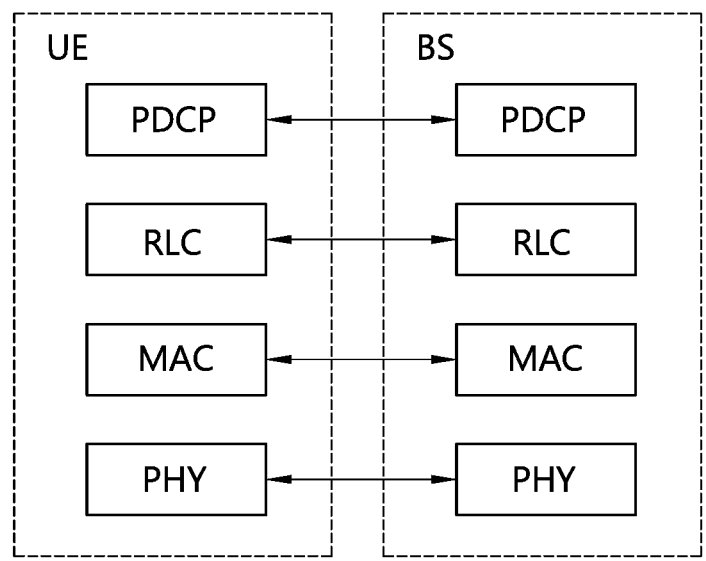
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
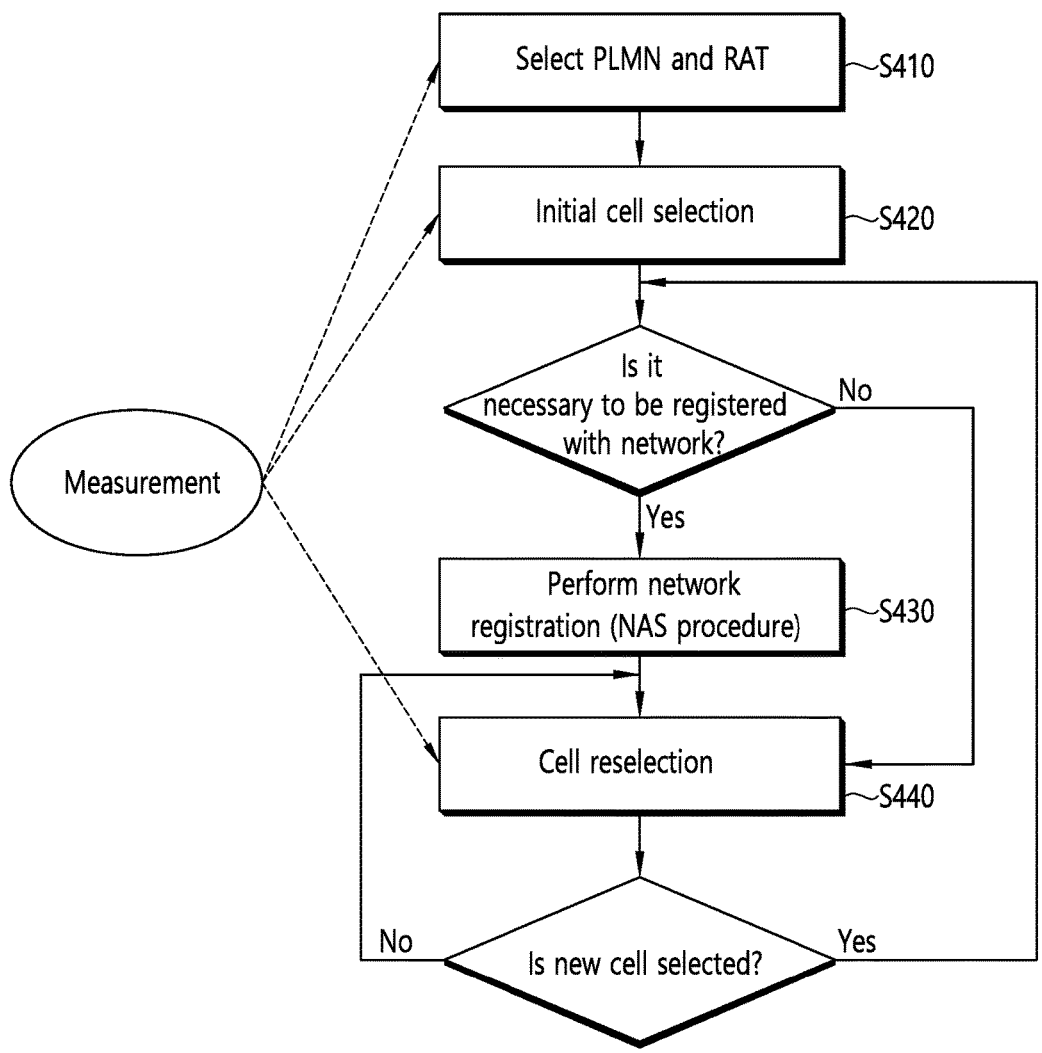
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
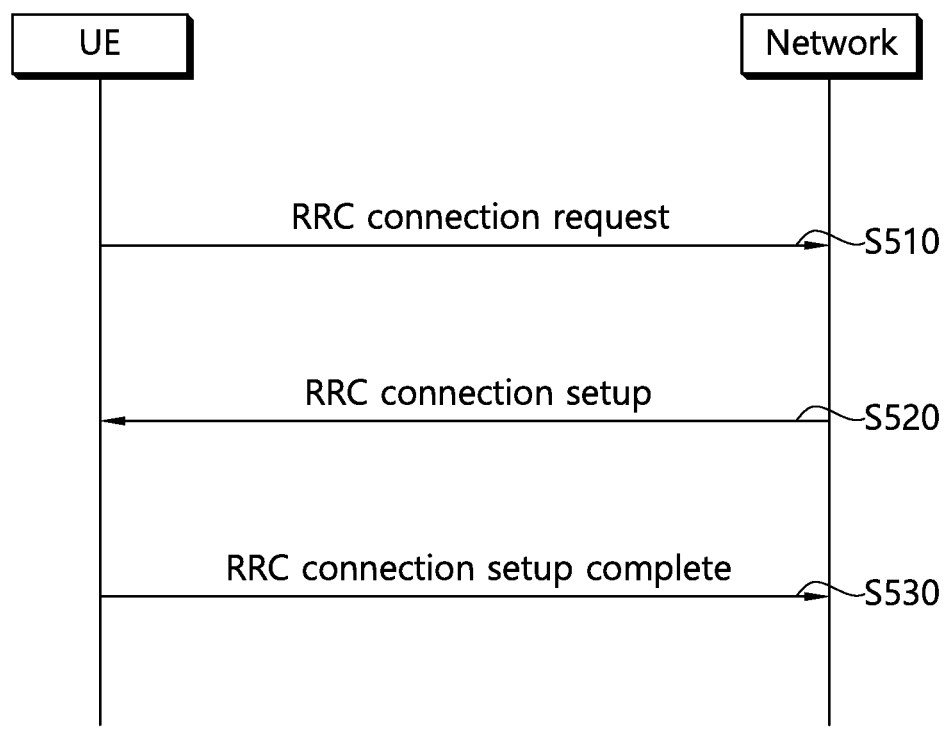
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
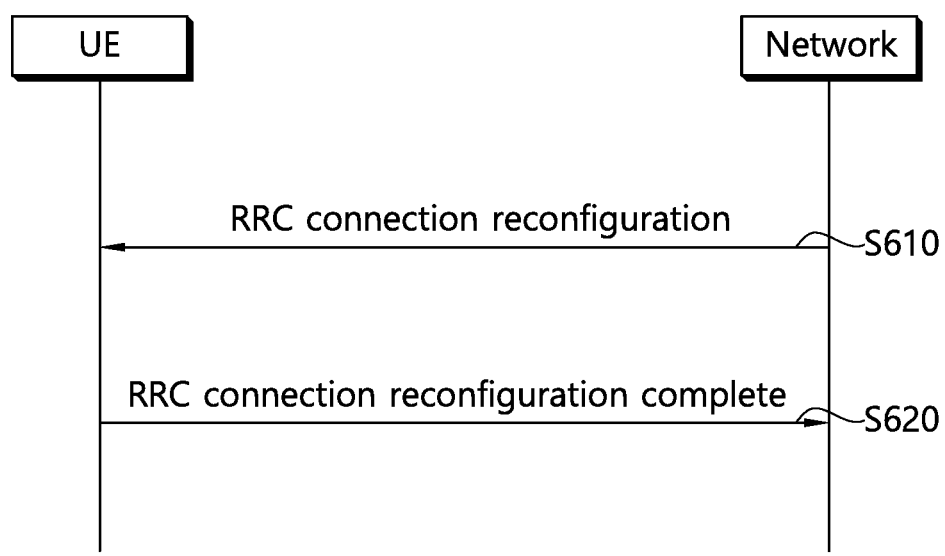
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

Hereinafter, a method and a procedure of selecting a cell by a terminal in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
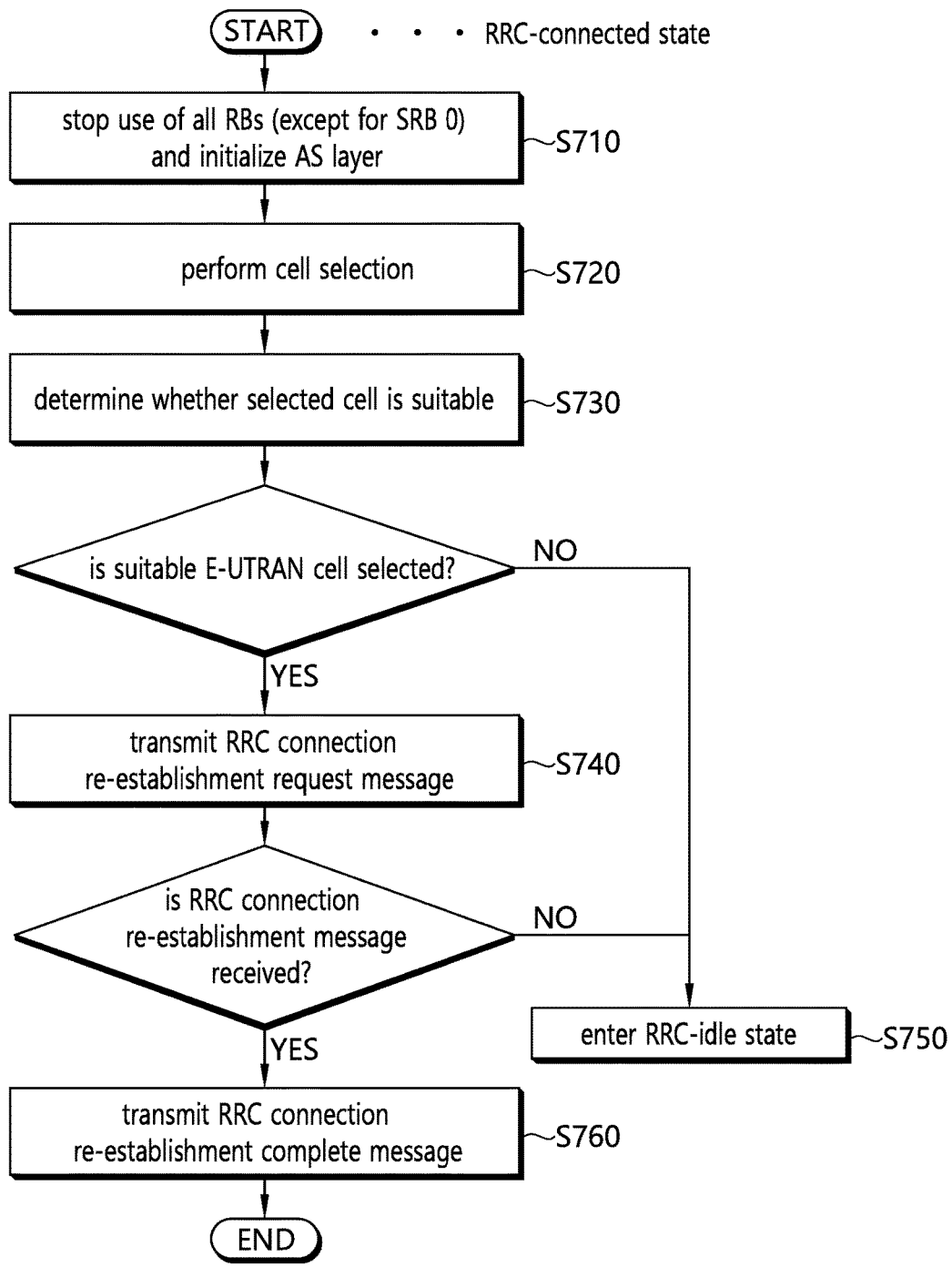
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
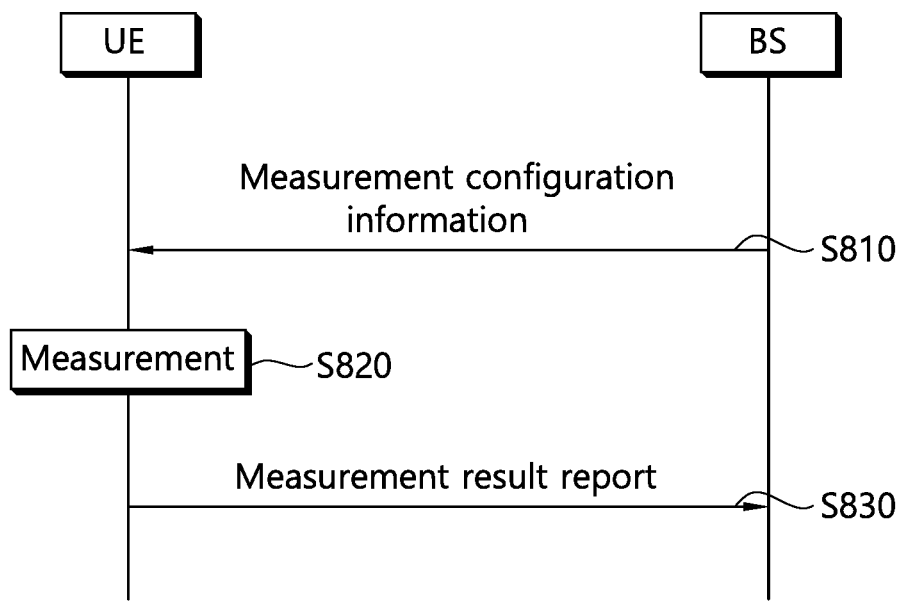
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
| --- | --- |
| Event A1 | Serving becomes better than threshold |
| Event A2 | Serving becomes worse than threshold |
| Event A3 | Neighbour becomes offset better than PCell/PSCell |
| Event A4 | Neighbour becomes better than threshold |
| Event A5 | PCell/PSCell becomes worse than threshold1 and neighbour becomes better than threshold2 |
| Event A6 | Neighbour becomes offset better than SCell |
| Event B1 | Inter RAT neighbour becomes better than threshold |
| Event B2 | PCell becomes worse than threshold1 and inter RAT neighbour becomes better than threshold2 |
| Event C1 | CSI-RS resource becomes better than threshold |
| Event C2 | CSI-RS resource becomes offset better than reference CSI-RS resource |

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

Figure 9:
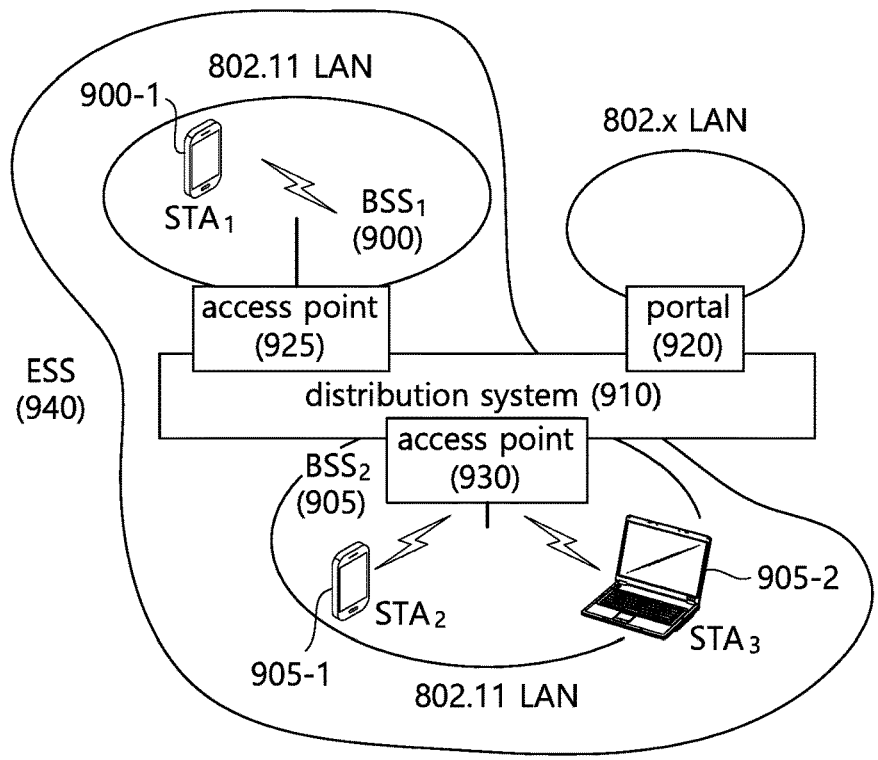
FIG. 9 shows the structure of a wireless local area network (WLAN)
Figure 9:
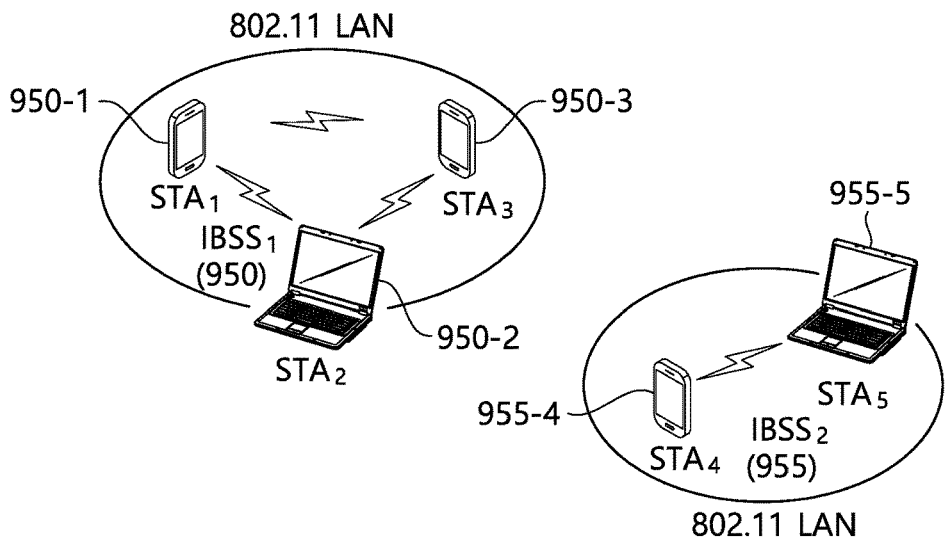

FIG. 9 shows the structure of a wireless local area network (WLAN). FIG. 9(a) illustrates the structure of an infrastructure network of Institute of Electrical and Electronics Engineers (IEEE) 802.11. FIG. 9(b) illustrates an independent BSS.

Referring the FIG. 9(a), a WLAN system may include one or more basic service sets (BSSs) 900 and 905. The BSSs 900 and 905 are a set of an access point (AP) and a station (STA), such as an AP 925 and STA1 900-1, which are successfully synchronized to communicate with each other, and are not a concept indicating a specific region. The BSS 905 may include one AP 930 and one or more STAs 905-1 and 905-2 that may be connected to the AP 930.

An infrastructure BSS may include at least one STA, APs 925 and 930 providing a distribution service, and a distribution system (DS) 910 connecting a plurality of APs.

The distribution system 910 may configure an extended service set (ESS) 940 by connecting a plurality of BSSs 900 and 905. The ESS 940 may be used as a term indicating one network configured by connecting one or more APs 925 or 930 through the distribution system 910. APs included in one ESS 940 may have the same service set identification (SSID).

A portal 920 may serve as a bridge that connects the WLAN (IEEE 802.11) and another network (for example, 802.X).

In the infrastructure network illustrated in the FIG. 9(a), a network between the APs 925 and 930 and a network between the APs 925 and 930 and the STAs 900-1, 905-1, and 905-2 may be configured. However, it is possible to configure a network between STAs in the absence of the APs 925 and 930 to perform communication. A network configured between STAs in the absence of the APs 925 and 930 to perform communication is defined as an ad hoc network or independent basic service set (BSS).

Referring to FIG. 9(b), an independent BSS (IBSS) is a BSS that operates in an ad hoc mode. The IBSS includes no AP and thus has no centralized management entity that performs a management function at the center. That is, in the IBSS, STAs 950-1, 950-2, 950-3, 955-4, and 955-5 are managed in a distributed manner. In the IBSS, all STAs 950-1, 950-2, 950-3, 955-4, and 955-5 may be mobile STAs.

Further, the STAs are not allowed to access the DS and thus establish a self-contained network.

An STA is a functional medium including medium access control (MAC) and a physical layer interface for a radio medium according to IEEE 802.11 specifications and may be used to broadly mean both an AP and a non-AP STA.

An STA may also be referred to as various names, such as a mobile terminal, a wireless device, a wireless transmit/receive unit (WTRU), user equipment (UE), a mobile station (MS), a mobile subscriber unit, or simply a user.

Hereinafter, WLAN measurement is described.

A UE supporting LTE-WLAN aggregation (LWA) may be set by an E-UTRAN to perform WLAN measurement. A WLAN measurement object may be set using WLAN identifiers (BSSID, HESSID, and SSID), a WLAN channel number, and a WLAN band. A WLAN measurement report may be triggered using an RSSI. The WLAN measurement report may include an RSSI, channel utilization, a station count, admission capacity, a backhaul rate, and a WLAN identifier. WLAN measurement may be configured to support at least one of activation of LWA, inter WLAN mobility set mobility, or deactivation of LWA.

Hereinafter, measurement according to the cell type will be described.

A measurement procedure may be classified according to the cell type. Cells may be divided by type into a serving cell, a listed cell, and a detected cell. The serving cell may include a PCell and one or more SCells when configured for a UE supporting carrier aggregation. The listed cell may be a cell listed as a measurement object. The detected cell is not listed as a measurement object but may be a cell detected by a UE on a carrier frequency indicated by a measurement object.

In E-UTRA, a UE may measure and report a serving cell, a listed cell, and a detected cell. In WLAN measurement, however, it may be generally inappropriate to report a detected AP on a particular WLAN channel. This is because there may be a plurality of APs not distributed by an operator together with APs distributed by the operator on the same channel, and thus the UE reporting detected APs may increase signaling overheads. Further, this is because a BS may need only measurement results of APs distributed by the operator for WLAN aggregation/interworking enhancement. For the above reasons, in WLAN measurement, it may be inappropriate to report a detected AP on a particular WLAN channel. However, a network may wish to obtain the measurement result of an AP not distributed by the operator in order to achieve an SON. That is, the network may wish to obtain the measurement result of an AP that is not distributed by the operator but is detected by the UE. Hereinafter, a method for a UE to perform WLAN measurement and to report a measured result and a device supporting the same according to one embodiment of the present invention will be described.

Figure 10:
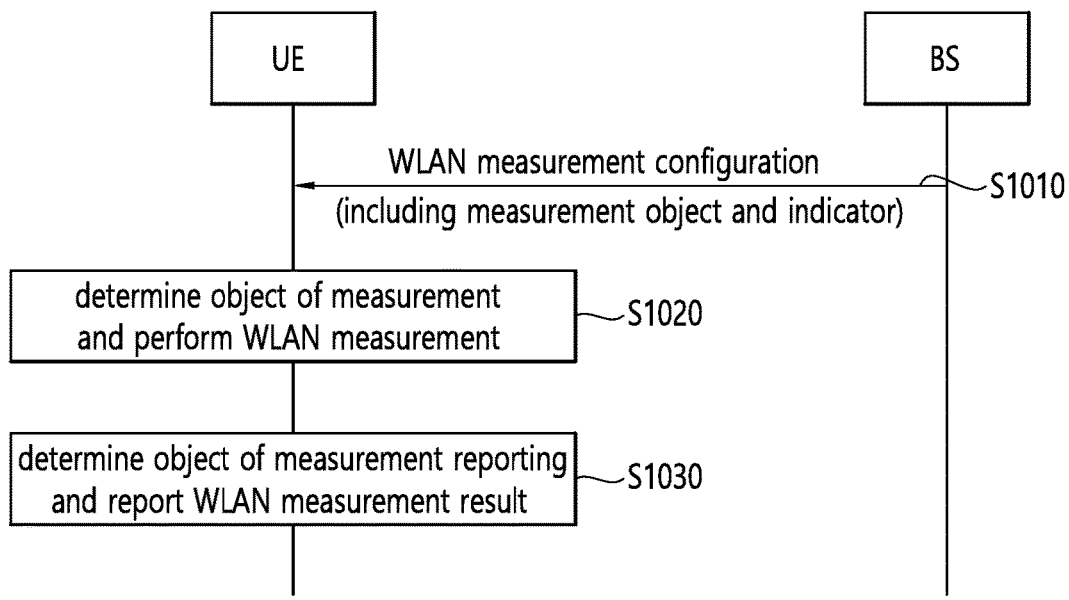
FIG. 10 shows a method for a UE to perform WLAN measurement and WLAN measurement reporting according to one embodiment of the present invention.

FIG. 10 shows a method for a UE to perform WLAN measurement and WLAN measurement reporting according to one embodiment of the present invention.

1. Step 1: UE receives WLAN measurement configuration (S1010)

(1) The UE may receive a WLAN measurement configuration from an LTE serving cell. The WLAN measurement configuration may include at least one of a measurement object, a measurement metric, or a reporting configuration.

(2) The measurement object may include at least one of a WLAN frequency list (that is, a WLAN channel list), a WLAN AP ID list, and a WLAN AP group ID list.

The measurement object may include an indicator. The indicator may indicate whether measurement on a WLAN AP detected by the UE is allowed. Alternatively, the indicator may indicate whether measurement result reporting on the WLAN AP detected by the UE is allowed. Alternatively, the indicator may indicate whether measurement and measurement result reporting on the WLAN AP detected by the UE is allowed. The detected WLAN AP may be an unlisted WLAN AP. A BS may use the indicator to indicate whether measurement and/or measurement result reporting on the detected WLAN AP is allowed.

(2) The measurement metric may be at least one of WLAN beacon RSSI, channel utilization in BSS load, an uplink (UL) backhaul rate, a downlink (DL) backhaul rate, a station (STA) count, and available admission.

(3) The reporting configuration may be a reporting criterion.

2. Step 2: UE performs WLAN measurement according to network configuration (S1020)

(1) When measurement on the detected WLAN AP is not allowed for the UE, the UE may perform the WLAN measurement only on a listed WLAN APs and/or a listed WLAN AP group. That is, when the indicator indicates that measurement on the detected WLAN AP is not allowed, the UE may perform WLAN measurement only on the listed WLAN AP and/or the listed WLAN AP group. The listed WLAN AP and/or the listed WLAN AP group may be a WLAN AP distributed by an operator and/or a WLAN AP group distributed by the operator.

For example, suppose that a first WLAN AP and a second WLAN AP are WLAN APs set to be measured, and a third WLAN AP and a fourth WLAN AP are WLAN APs detectable by the UE. When measurement on a detected WLAN AP is not allowed for the UE, the UE may perform WLAN measurement only on the first WLAN AP and the second WLAN AP.

(2) When measurement on the detected WLAN AP is allowed for the UE, the UE may perform WLAN measurement not only on the listed WLAN AP and/or the listed WLAN AP group but also on an unlisted WLAN AP and/or WLAN AP group. That is, when the indicator indicates that measurement on the detected WLAN AP is allowed, the UE may perform WLAN measurement not only on the listed WLAN AP and/or the listed WLAN AP group but also on a WLAN AP and/or WLAN AP group detected by the UE.

When WLAN frequency information is included in the measurement object, the detected WLAN AP and/or the detected WLAN AP group may be limited to a WLAN AP and/or a group of a WLAN AP on a frequency listed in the WLAN frequency information.

When no WLAN frequency information is included in the measurement object, the UE may perform WLAN measurement on unlisted WLAN APs and/or unlisted WLAN AP groups on all WLAN frequencies. That is, when no WLAN frequency information is included in the measurement object, the UE may perform WLAN measurement on detected WLAN APs and/or detected WLAN AP groups on all the WLAN frequencies.

For example, suppose that a first WLAN AP and a second WLAN AP are WLAN APs set to be measured, and a third WLAN AP and a fourth WLAN AP are WLAN APs detectable by the UE. When measurement on a detected WLAN AP is allowed for the UE, the UE may perform WLAN measurement on the first WLAN AP, the second WLAN AP, the third WLAN AP, and the fourth WLAN AP. When measurement on a detected WLAN AP is allowed for the UE, WLAN frequency information is included in the measurement object, the third WLAN AP corresponds to a frequency listed in the WLAN frequency information, and the fourth WLAN AP does not correspond to a frequency listed in the WLAN frequency information, the UE may perform WLAN measurement on the first WLAN AP, the second WLAN AP, and the third WLAN AP. That is, in this case, since the fourth WLAN AP is detected by the UE but is not a WLAN AP on a frequency listed in the WLAN frequency information, the UE may not perform WLAN measurement on the fourth WLAN AP.

3. Step 3: UE performs WLAN measurement reporting according to network configuration (S1030)

(1) When measurement result reporting on the detected WLAN AP is not allowed for the UE, the UE may perform WLAN measurement result reporting only on the listed WLAN AP and/or the listed WLAN AP group. That is, when the indicator indicates that measurement result reporting on the detected WLAN AP is not allowed, the UE may perform WLAN measurement result reporting only on the listed WLAN AP and/or the listed WLAN AP group.

For example, suppose that a first WLAN AP and a second WLAN AP are WLAN APs set as an object of measurement reporting, and a third WLAN AP and a fourth WLAN AP are WLAN APs detectable by the UE. When measurement result reporting on a detected WLAN AP is not allowed for the UE, the UE may perform WLAN measurement result reporting only on the first WLAN AP and the second WLAN AP.

For example, suppose that a first WLAN AP and a second WLAN AP are WLAN APs set as an object of measurement reporting, and a third WLAN AP and a fourth WLAN AP are WLAN APs detectable by the UE. When measurement on a detected WLAN AP is allowed for the UE and measurement reporting on the detected WLAN AP is not allowed for the UE, the UE may perform WLAN measurement on the first WLAN AP, the second WLAN AP, the third WLAN AP, and the fourth WLAN AP and may perform measurement result reporting only on the first WLAN AP and the second WLAN AP.

(2) When measurement result reporting on the detected WLAN AP is allowed for the UE, the UE may perform WLAN measurement result reporting not only on the listed WLAN AP and/or the listed WLAN AP group but also on an unlisted WLAN AP and/or WLAN AP group. That is, when the indicator indicates that measurement result reporting on the detected WLAN AP is allowed, the UE may perform WLAN measurement result reporting not only on the listed WLAN AP and/or the listed WLAN AP group but also on a WLAN AP and/or WLAN AP group detected by the UE.

When WLAN frequency information is included in the measurement object, the detected WLAN AP and/or the detected WLAN AP group may be limited to a WLAN AP and/or a group of a WLAN AP on a frequency listed in the WLAN frequency information.

When no WLAN frequency information is included in the measurement object, the UE may perform WLAN measurement result reporting on unlisted WLAN APs and/or unlisted WLAN AP groups on all WLAN frequencies. That is, when no WLAN frequency information is included in the measurement object, the UE may perform WLAN measurement result reporting on detected WLAN APs and/or detected WLAN AP groups on all the WLAN frequencies.

For example, suppose that a first WLAN AP and a second WLAN AP are WLAN APs set to be measured, and a third WLAN AP and a fourth WLAN AP are WLAN APs detectable by the UE. When measurement result reporting on a detected WLAN AP is allowed for the UE, the UE may perform WLAN measurement on the first WLAN AP, the second WLAN AP, the third WLAN AP, and the fourth WLAN AP and may report the measurement results. When measurement result reporting on a detected WLAN AP is allowed for the UE, WLAN frequency information is included in the measurement object, the third WLAN AP corresponds to a frequency listed in the WLAN frequency information, and the fourth WLAN AP does not correspond to a frequency listed in the WLAN frequency information, the UE may perform WLAN measurement on the first WLAN AP, the second WLAN AP, and the third WLAN AP and may report the WLAN measurement results. That is, in this case, since the fourth WLAN AP is detected by the UE but is not a WLAN AP on a frequency listed in the WLAN frequency information, the UE may not perform WLAN measurement and WLAN measurement reporting on the fourth WLAN AP.

According to one embodiment of the present invention, when the indicator indicates that measurement on a WLAN AP detected by the UE is allowed, the UE may perform measurement and measurement result reporting on the detected WLAN AP. Alternatively, when the indicator indicates that measurement result reporting on a WLAN AP detected by the UE is allowed, the UE may perform measurement and measurement result reporting on the detected WLAN AP. Alternatively, when the indicator indicates that measurement and measurement result reporting on a WLAN AP detected by the UE is allowed, the UE may perform measurement and measurement result reporting on the detected WLAN AP.

Figure 11:
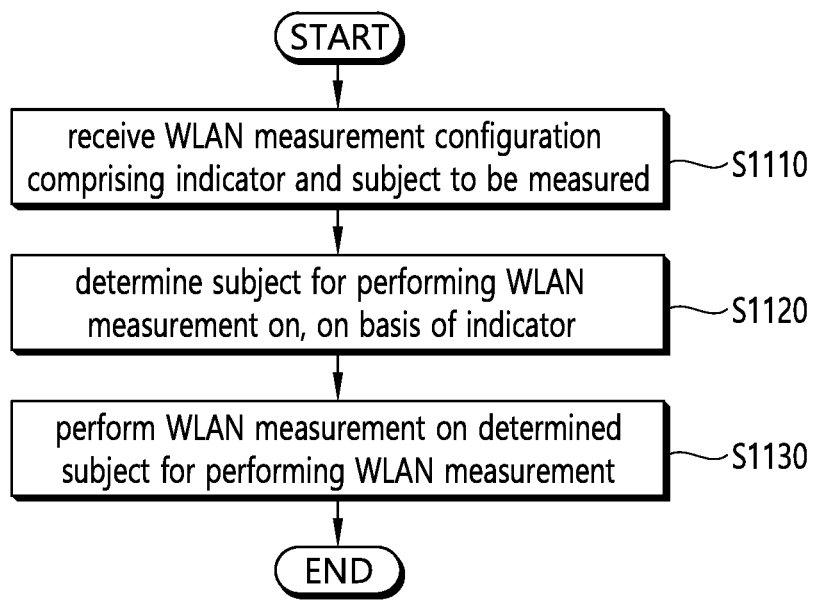
FIG. 11 shows a method for a UE to perform WLAN measurement according to one embodiment of the present invention.

FIG. 11 shows a method for a UE to perform WLAN measurement according to one embodiment of the present invention.

Referring to FIG. 11, the UE may receive a WLAN measurement configuration including an indicator and a measurement object (S1110).

The indicator may indicate whether measurement on a WLAN AP detected by the UE is allowed. The WLAN measurement configuration may be received from a serving cell. The indicator may be included in the measurement object.

The UE may determine an object of WLAN measurement based on the indicator (S1120).

When the indicator indicates that measurement on the detected WLAN AP is allowed, the object of WLAN measurement may include a listed WLAN AP and the detected WLAN AP. When the indicator indicates that measurement on the detected WLAN AP is not allowed, the object of WLAN measurement may include a listed WLAN AP. The listed WLAN AP may include at least one of a WLAN frequency list, a WLAN AP ID list, and a WLAN AP group ID list. The detected WLAN AP may not be included in the listed WLAN AP but may be a WLAN AP detected by the UE. When the measurement object includes WLAN frequency information, the detected WLAN AP may be a WLAN AP on a WLAN frequency listed in the WLAN frequency information.

The UE may perform WLAN measurement on the determined object of WLAN measurement (S1130). The UE may report a WLAN measurement result.

The UE may determine an object of WLAN measurement reporting based on the indicator and may report a WLAN measurement result of the determined object of WLAN measurement reporting. The indicator may indicate whether measurement result reporting on the WLAN AP detected by the UE is allowed.

When the indicator indicates that measurement result reporting on the detected WLAN AP is allowed, the object of WLAN measurement reporting may include a listed WLAN AP and the detected WLAN AP. When the indicator indicates that measurement result reporting on the detected WLAN AP is not allowed, the object of WLAN measurement reporting may be a listed WLAN AP. When the measurement object includes WLAN frequency information, the detected WLAN AP may be a WLAN AP on a WLAN frequency listed in the WLAN frequency information.

Figure 12:
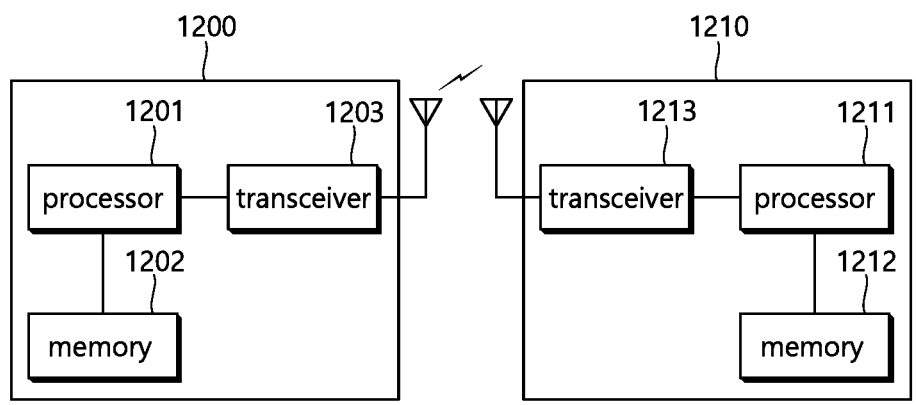
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), wireless local area network (WLAN) measurement in a wireless communication system, the method comprising:
   receiving a measurement configuration,
      wherein the measurement configuration includes information related to a measurement report of a first WLAN access point (AP) which is detected by the UE and is not listed; and
   performing the measurement report,
      wherein the measurement report includes an identifier of the first WLAN AP, based on the information representing that the measurement report of the first WLAN AP is allowed; and
      wherein the measurement report includes an identifier of a second WLAN AP which is listed, based on the information representing that the measurement report of the first WLAN AP is not allowed.

2. The method of claim 1, wherein based on the information representing that the measurement report of the first WLAN AP is allowed, the measurement report includes both the identifier of the first WLAN AP and the identifier of the second WLAN AP which is listed.

3. The method of claim 1, wherein the measurement configuration includes WLAN frequency information.

4. The method of claim 1, wherein the measurement configuration comprises at least one of a WLAN frequency list, a WLAN AP ID list, and a WLAN AP group ID list.

5. The method of claim 1, further comprising:
   determining, by the UE, at least one or more WLAN APs to be included in the measurement report based on the information.

6. The method of claim 1, wherein the measurement configuration is received from a serving cell.

7. The method of claim 1, wherein the information is included in a measurement object.

8. A user equipment (UE) for performing wireless local area network (WLAN) measurement in a wireless communication system, the UE comprising:
   a memory;
   a transceiver; and
   a processor, operatively coupled to the memory and the transceiver,
   wherein the processor is configured to:
      control the transceiver to receive a measurement configuration,
         wherein the measurement configuration includes information related to a measurement report of a first WLAN access point (AP) which is detected by the UE and is not listed; and
      perform the measurement report, wherein the measurement report includes an identifier of the first WLAN AP, based on the information representing that the measurement report of the first WLAN AP is allowed,
         wherein the measurement report includes an identifier of a second WLAN AP which is listed, based on the information representing that the measurement report of the first WLAN AP is not allowed.

9. The UE of claim 8, wherein when the information indicates that measurement on the detected WLAN AP is allowed, the object of WLAN measurement comprises a listed WLAN AP and the detected WLAN AP.

* * * * *